UNITED STATES PATENT OFFICE.

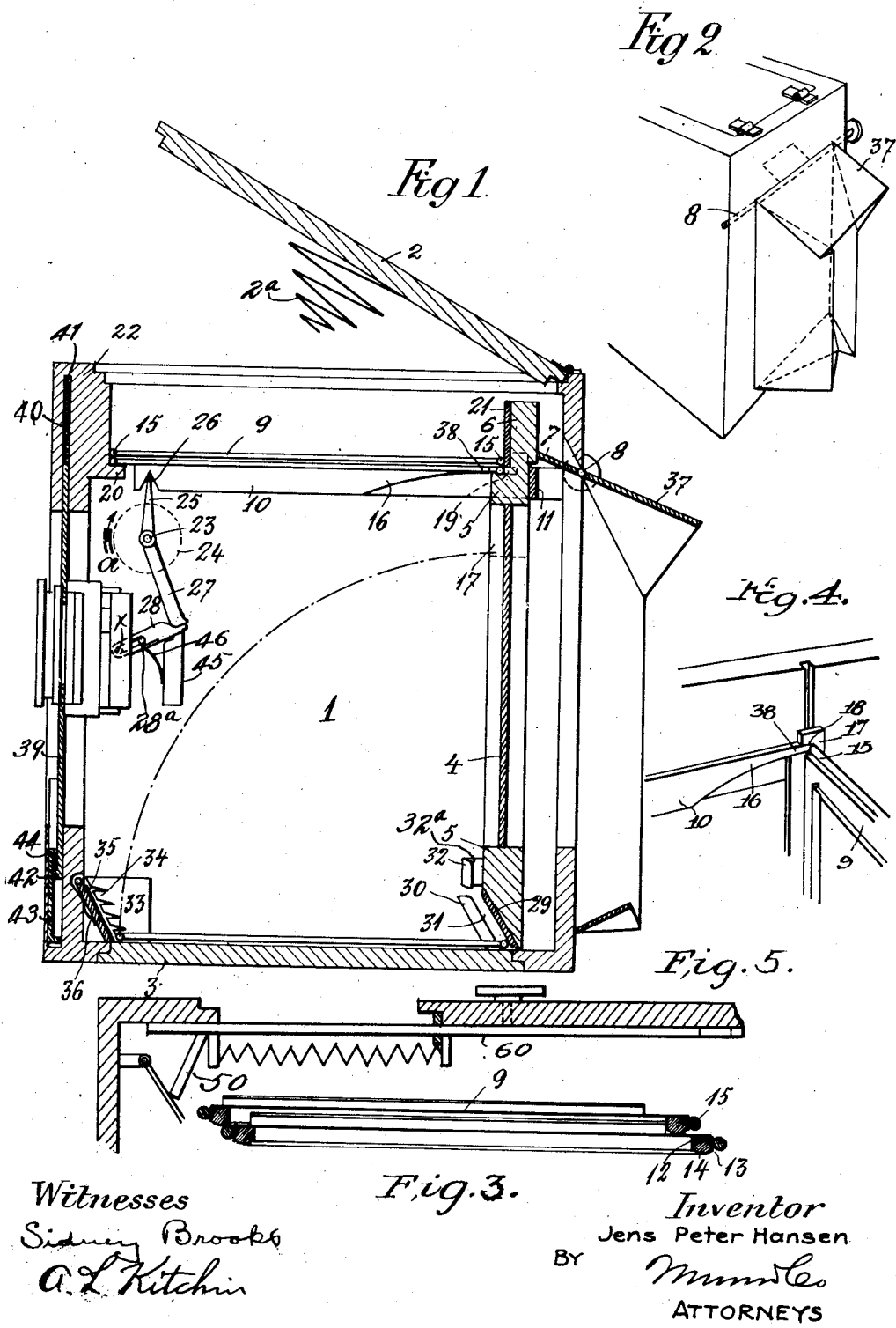

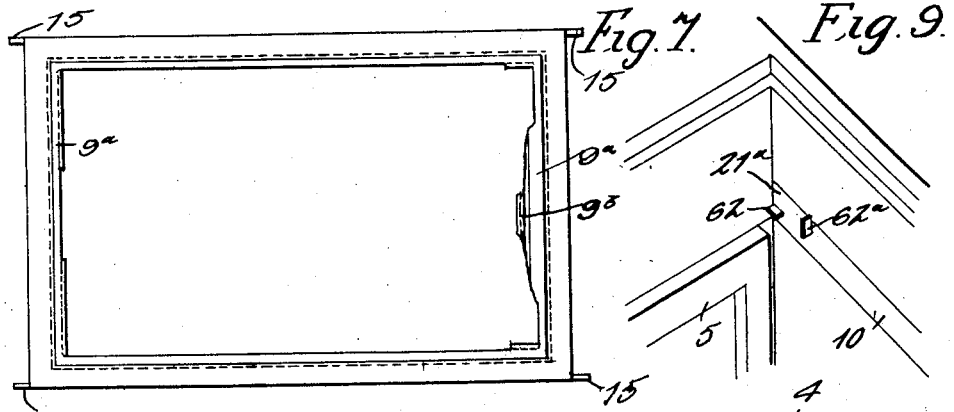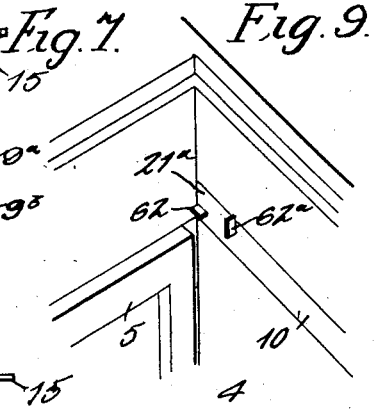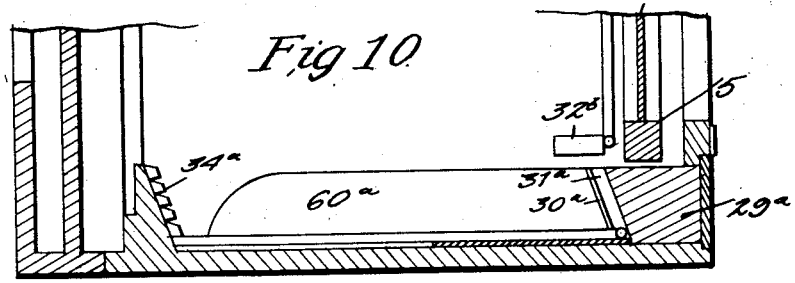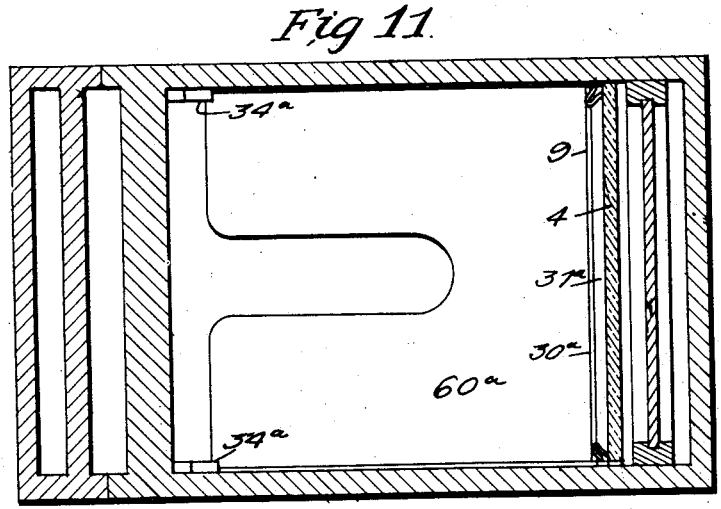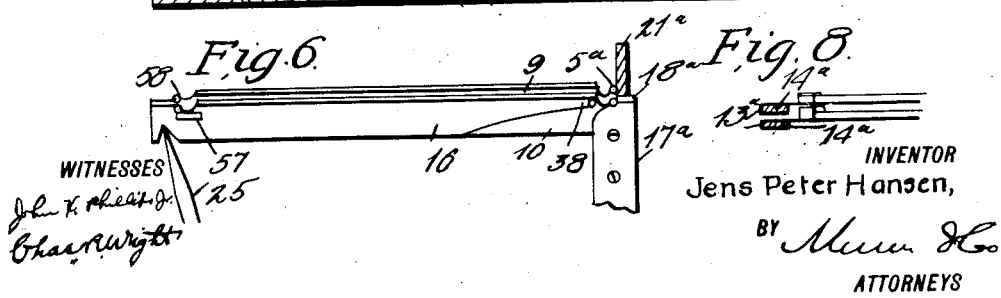

JENS PETER HANSEN, OF COPENHAGEN, DENMARK.

MAGAZINE-CAMERA.

1,210,164.

Specification of Letters Patent. Patented Dec. 26, 1916.

Application filed May 10, 1912. Serial No. 696,434.

*To all whom it may concern:*

Be it known that I, JENS PETER HANSEN, a subject of the King of Denmark, residing at No. 9 Aarhusgade, Copenhagen, Denmark, have invented certain new and useful Improvements in Magazine-Cameras, of which the following is a specification.

My invention treats of a photographic magazine camera with ground glass and plate-changing mechanism.

The characteristic feature of the invention is that it permits of a direct focusing on the ground glass even to a fraction of a second before the exposure, as the plates are placed under the top of the camera in such a manner, that the turning of a handle swings the plate down in a vertical direction to be swung farther in the opposite horizontal direction in the bottom of the camera after the exposure is completed.

Finally arrangements are made in the camera, which insure the closing of the shutter and the focusing hood previous to the changing of plates.

The invention is shown in the accompanying drawings, where—

Figure 1 is a longitudinal section through the camera with the ground glass in position for focusing and the focusing hood open. Fig. 2 shows in perspective the back of the camera, seen from behind. Fig. 3 shows some unexposed plates together with their carriers and the undermost pushed rearwardly immediately before swinging downward. Fig. 4 is a detail of the suspending arrangement for the carrier during exposure. Fig. 5 is a sectional view showing a method of effecting the connection between the shutter and changing mechanism in cameras provided with a bellows between the front board and the box. Fig. 6 shows a modified arrangement for changing the plates downward. Fig. 7 shows a plate carrier seen from the plate side. Fig. 8 is a partial section of two carriers with their plates. Fig. 9 shows one upper corner of the carrier as seen from the inside and from above. Fig. 10 is a vertical section of the lower portion of the camera showing a modification. Fig. 11 is a horizontal section of the same.

The camera consists of a box 1, having a blackened inside, of the usual pattern, with a hinged lid 2, which by suitable means closes tightly on to the box. Under the lid is the magazine, whose longitudinal sides are formed of the sides of the camera, while on the front side it is bounded by a plate 22 and at the rear by a screen 21, while the plates are kept down by a spring $2^a$ fixed on the lid. Finally, the camera has a loose removable bottom 3 for taking out the exposed plates. The unexposed plates are placed in their carriers 9 (Fig. 3) in such manner that, when stored in the magazine, the film-side is upward; the carriers consist of a protection plate with three grooves, in which the photographic plate is inserted. Each carrier is provided with a flange 12 on its upper face and a rim 13 on its lower face. The rim 13 incloses a light excluding strip 14 of suitable material, and the flange 12, which extends on three sides of the carrier, forms a holding device for the photographic plate. When the carriers are superimposed as shown in Fig. 3 the rim 13 surrounds the flange 12. The rectangle thereby formed is somewhat longer than the plate in order to permit of its motion. By bringing the carriers over each other the frame upon the underside of the overlying carrier will form an opaque lid for the underlying photographic plate. At the four corners of the carrier are fixed pins 15. The upper plate is closed by a blind carrier consisting of a plate having a groove and light excluding strip under it.

The ground glass 4 is fitted in a frame 5 (Fig. 1) to which is fastened a fork 10, placed upon the inside of the camera, the back 11 of which fork goes behind the ground-glass frame and supports it. The two prongs of the fork 10 slide in a couple of grooves on the inside of the camera and can, by means which will be explained later, move in a horizontal direction. The frame 5 carries an upper extension 6, which actuates an arm 7 carried by an axle 8, whereon is placed the upper side of the focusing-hood 37. This hood consists of four parts (Fig. 2) which are so united that the whole of the four-sided hood can be opened or shut by simply turning the axle 8 by means of the hand-wheel on the end of the shaft 8, The inner side of the prongs of the fork 10 have two projecting ribs 16, engaging with a plate 17 which is provided with a notch 18 (Fig. 4), which is on the side opposite the point of the rib 16. Such a plate 17 is fixed on either side of the camera. Outside these two notches 18 there is a groove 19 (Fig. 1) in the upper edge of the frame.

The carriers with the unexposed plates rest at the back in the two plates 17, which inclose the pins 15 and in front they are carried by a cross molding 20. On the one side of the camera there is placed outside a finger-wheel 24 upon an axle running through the camera, which bears two arms 25, which are in contact with the notch 26 on the lower side of the prongs of the fork 10 whereby a turn of the axle 23 will give the prongs of the fork 10 and the lower carrier connected with it a movement forward or backward.

On the axle 23 there is placed another arm 27 which by a suitable transmission member 28 can act upon the shutter. As previously mentioned the exposed plates fall down to the bottom of the camera, during exposure they are retained at their bottom edge by a couple of blade springs 32, fixed to the ground glass frame, and furnished with hooks 32$^a$, moreover the lowest edge of the ground-glass-frame is cut off slantingly so that it can lie against a slanting wall 29. On the sides of the camera two slanting rectangular projections 30 are placed before this wall, in such a manner that two recesses 31 are formed between the walls 29 and the projections 30. In front the exposed plates are held by a couple of spring plates 33, fixed in the side of the camera, which are furnished with spring teeth 34, which engage the carriers and hold them firmly. Behind the teeth is pivoted a screen plate 35, which is held forward by a spring 36. This plate assists in preventing the rays of light during later exposures or focusings from striking the plates which have been already exposed.

For focusing the ground-glass it must by a turn of the finger wheel 24 be carried forward into the position shown in Fig. 1, and thereupon the shutter and the focusing-hood 37 are opened. After focusing, the finger wheel is turned in the direction of the arrow $a$, whereby the ground-glass frame is brought back and presses upon the arm 7, which jams the focusing-hood 37 and keeps it closed, so that light cannot penetrate. At the same time the arm 27 is moved forward and actuates the shutter, which thereby closes immediately. Through the continued movement of the arm 25, the points 38 of the ribs 16 grip behind the pins 15 on the lower carrier and thereby push it back in under the plate 21 and into the notch 18, where the ends 38 of the ribs 16 hold it firmly.

Through the back movement of the lower carrier, the front end will be released from the molding 20, and the carrier will then swing down in a vertical position around the back pin 15, and now the plate is in position for exposure, lying immediately in front of the ground-glass, which it covers quite opaquely, as it will be remembered that the lowest pins are held fast by the hook spring 32$^a$. The return movement of the carrier is so nicely adjusted, that the film side of the plate comes exactly on the spot, where the mat-side of the ground-glass has been during focusing. When the lower carrier has been brought into the place of the ground-glass, the lowest carrier but one will occupy a slanting position, as the front end of the said carrier will rest directly upon the moulding 20, while the two pins in the rear part will rest upon the ribs 16. When the prongs of the fork 10 are moved back to the focusing position, the ends 38 of the ribs 16 will slide past the pins 15, and the carrier then falls down into the former position of the lowest carrier. After exposure the changing downward of the plate to the bottom of the camera is accomplished simply by turning back the finger wheel 24. The ground-glass is thereby brought forward into the focusing position, driving the carrier with the exposed plate before it until the spring 32 has arrived outside the recesses 31, (Fig. 1). At that moment the upper pin of the carrier becomes clear of the plate 17 and the carrier then glides vertically downward, and then the lower part of the carrier is turned back somewhat at the slope of the recess 31. By this means the upper end of the carrier swings forward and falls with the film side downward to the bottom of the camera, where it is held immovable by the teeth 34 and the recess 31.

The lens-board 39 can be displaced in a vertical direction in a frame, in which there are a couple of incisions, in which the board can travel. Above, the board can be pushed up into a couple of notches 40, and the board can have an extension of opaque material 41 laid in bellows-folds, which will preserve the opacity. Underneath, the board 39 can have a cross molding 42, which is inclosed by a short crossboard 43, having another cross molding 44. Of course the opaque material can be placed underneath and the crossboard above, or boards or opaque material both above and below.

To insure the shutter being always closed during the changing there is placed in one side of the camera a bracket 45, carrying a spring 46, which under normal conditions keeps the transmission member 28 in the position shown in Fig. 1. By turning the axle 23 the arm 27 pushes the said member 28 to the left, overcoming the resistance of the spring 46. The motion of the member 28 is guided by a pivot $x$ in a slot $28^a$ in the member. The opposite end of the member 28 presses, when it is in its displaced position, against a vertically hinged plate, which releases the shutter, so that it is closed, and as stated, this movement takes place prior to the plate falling down into the position of exposure in such a manner, that there is an absolute guaranty that the shutter is closed before the plate can be exposed. If after the focusing it is not desired to expose, one can close the shutter with a slight movement of the arm 27, which thereby releases the shutter, whereupon the arm is turned back again, before it has been moved sufficiently to bring a plate into the position for exposure.

In Fig. 6 is shown a modified application of the carriers whereby the advantage is obtained, that they do not require to be displaced in proportion to one another, so that they can be built shorter, which gives as result, that the depth and height of the camera will be smaller. In this figure the carriers for the most part do not rest upon a molding on the front plate, but on a plate 57 on the prongs of the fork 10. At the back the pins of the carriers rest in the above open notch $18^a$ on the plate $17^a$ and the carriers, placed one above another, are stopped at the back by the cross plate $21^a$. When the points 38 through the return movement of the prongs of the fork 10 come into contact with the pins 15, thereby retaining them in the notch, the plate 58 glides in over the front pins of the lowest carrier, which rests upon the plate 57, and the said projection, which is likewise fixed upon the prongs of the fork 10 is released, simultaneously with the front end of the carrier, which thereby swings down in the manner formerly described. The next lowest carrier rests during the exposure upon the plate 58, and when the prongs of the fork 10 are carried forward to the focusing position, this carrier falls down upon the plate 57. Instead of the described upstanding flanges 12 and rims 13 on the carriers, turned down edges 59 may be used, of which the one grips the other, as appears in the modification shown in Fig. 6.

The carriers as shown in Fig. 3 may be formed as shown in Figs. 7 and 8, by which a better light-excluding effect is obtained. The edges of the protecting plates are bent down, forming rectangular broad rims 13a, whereby the light will have several edges to pass before it can arrive to the photographic plate making it fully impossible for the plates being exposed to the light. Also in this embodiment there may be arranged light excluding strips $14^a$ in the rims. It may be easily seen that the shape of the flanges makes it possible for the plates to move a little in relation to each other without this augmenting the possibility for the light to injure the photographic plates.

In order that it may be possible to load the camera in the day-light, the flanges 12 and rims 13 may extend on all the four sides of the protecting plate. Of course, the photographic plates must be inserted in the carriers in a dark room, where the carriers are placed on each other, the bottom and top plates being blind carriers and a strap or the like is placed around them for holding them together. After the plates have been inserted in the camera the strap is taken away and the lid closed.

When all the plates have been exposed, the camera is placed in the edge of a table or the like, the bottom of the camera is taken away and the camera is lifted up, the plates being thereby free. The strap is then again placed around the plates.

When the carriers are provided on all the four sides with flanges, it is impossible to push in the photographic plates from the side. In such a case the said plates must be placed in the carriers from above. This can be performed by making a greater distance than the length or breadth of the photographic plates between two opposite flanges, of the carrier $9^a$ and arranging a spring $9^b$ under one flange as shown in Fig. 7. Under this flange the one edge of the photographic plate is inserted and by pressing against the spring the other edge of the plate can be placed under the other flange.

Of course, the flange and rims of the carriers can be formed in different manners, without changing the principle in the carriers, namely that each one forms a lid for another, the light-exclusion being obtained through projections or frames of suitable forms on the upper as well as on the underside of the carriers.

If the camera is intended to be arranged upon a tripod head it will be unsuitable to so arrange it that the plates are taken out through the bottom thereof, as described above. In such a case the plates are taken out through the back of the camera.

Figs. 10 and 11 show a casing $60^a$, arranged at the bottom of the camera and intended to be taken out through the back thereof. For this purpose the underside of the ground glass frame 5 terminates short of the bottom of the camera for permitting the casing to be taken out, and the back wall of the camera with the screen is hinged to the camera as a door.

In order to make it possible to grasp with the one hand all the plates the bottom of the casing is provided with a cut out portion 61 in the middle.

When the casing $60^a$ is used, the parts

29—36 must be modified. The slanting wall 29 (Fig. 1) is omitted and for it is substituted an oblique wooden strip 29ᵃ fixed to the back of the casing. The slanting rails 30ᵃ are arranged on the side walls of the casing. The spring plates 33ᵃ with the teeth 34ᵃ are arranged parallel with the rails 30ᵃ on an oblique wooden strip, extending crosswise through the camera.

If desired the plates 17 can be omitted and instead thereof the plate 21ᵃ may be provided with the projections 62, as shown in Fig. 9. The spring hooks 32ᵇ can be arranged on the side walls. The slanting rib 16 can also be omitted, as the projections 62 will bear the one end of all the carriers. For said ribs 16 a pin 62ᵃ may be substituted placed in the fork 10 in the place of the point 38.

It will be apparent, that all details in such a complicated mechanism can be varied in many ways, without such variations constituting a departure from the principles of the invention. In the present specification some modifications as regards the carrying out of some details have been described, but stress should be laid upon the fact, that several other parts can be arranged in another manner. Especially it is to be observed that the ground-glass frame may be fixed and that instead thereof the lens of the lens board may be movable quite in the same way as is described above with respect to the ground-glass frame.

Having now particularly described and ascertained the nature of my said invention and in what manner the same is to be performed, I declare that what I claim is:

1. In a photographic magazine camera, a shutter, a plate carrier, a focusing hood, a movable ground glass frame, and means whereby the shutter, carrier and hood may be operated from the ground glass frame to close the shutter and hood and to swing the carrier in front of the lens frame and after exposure to swing the said carrier in reverse position on the bottom of the camera.

2. In a photographic magazine camera, a movable ground glass frame, plate carriers, and means for operating the carriers from the ground glass frame, each carrier comprising rectangular frames on both sides, said upstanding frames inclosing light excluding strips, the sides of the frames being longer in one direction than the corresponding sides of the plate, whereby the underlying plate will be surrounded by the frame on the underside of the overlying plate, thereby permitting the underlying plate to be displaced without exposure to light.

3. In a photographic magazine camera, a box having grooves on its inner face, a movable ground glass frame having a notch, a plate carrier having at its sides projecting pins resting in the notch of the said frame, means for supporting the front end of the carrier, a fork secured to the frame, and means for operating the frame, said fork having prongs at the ends of its members adapted to engage the pins of the carrier and move them into the said grooves.

4. In a photographic magazine camera, a box having grooves on its inner surface, a movable ground glass frame having a notch, a plate carrier having at its sides pins resting in the notch of the frame, a fork secured to the frame, means for operating the frame, said fork having prongs at the ends of its members adapted to engage the pins of the carrier and to move them into the said groove, a guideway at the bottom of the box in front of the ground glass frame, and spring hooks on the said frame for engaging the pins of the carrier and guiding the pins into the said guideway.

5. In a magazine camera a box having grooves in its inner surface, a movable ground glass frame having a notch, a plate carrier having pins at its sides projecting into the notch of the said frame, means for supporting the front end of the carrier, a member secured to the frame and having prongs adapted to engage the pins of the carrier and move them into the groove, and a rock shaft having an arm engaging the said member to operate it, and thereby the frame.

6. In a magazine camera, a box having grooves in its inner face, a movable ground glass frame having a notch, a plate carrier having pins engaging the notch of the frame, means for supporting the front end of the carrier, a member secured to the frame and having prongs for moving the pins from the notch of the frame into the grooves of the box, means for operating the frame, a guideway at the rear of the bottom of the box for guiding the plate carrier, and a spring clamping device at the front of the box for holding a plate.

7. In a magazine camera, a box having grooves on its inner face, a movable ground glass frame having a notch, a plate carrier having pins projecting into the notch of the frame, means for supporting the front ends of the carrier, a member secured to the frame and having means engaging the pins to move them from the notch of the frame into the grooves of the box, means for operating the frame, a guideway at the rear of the bottom of the box for guiding the plate carrier, said guideway being partly formed by the said frame, a hook-shaped spring above the guideway, and a spring clamping device at the front of the box for holding the plate carrier.

8. In a photographic device of the character described, a housing, a lens arranged in one side of said housing, means for successively bringing photographic plates opposite said lens, a focusing plate arranged opposite said lens, said housing being formed with an opening opposite the focusing plate, and a hood for normally closing said opening, said hood including a collapsible shield and a rotating shaft connected with the shield for opening and closing the same.

In testimony whereof I affix my signature in presence of two witnesses.

JENS PETER HANSEN.

Witnesses:
　CHARLES HUDE,
　TISTRAM WOLSING,